(12) United States Patent
Koehler et al.

(10) Patent No.: US 8,370,055 B2
(45) Date of Patent: Feb. 5, 2013

(54) DRIVER ASSISTANCE SYSTEM

(75) Inventors: Markus Koehler, Ludwigsburg (DE); Uwe Zimmermann, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 838 days.

(21) Appl. No.: 12/302,445

(22) PCT Filed: Jun. 5, 2007

(86) PCT No.: PCT/EP2007/055966
§ 371 (c)(1),
(2), (4) Date: Jul. 17, 2009

(87) PCT Pub. No.: WO2008/012143
PCT Pub. Date: Jan. 31, 2008

(65) Prior Publication Data
US 2009/0326818 A1    Dec. 31, 2009

(30) Foreign Application Priority Data
Jul. 24, 2006  (DE) .......................... 10 2006 034 122

(51) Int. Cl.
*G05D 1/02* (2006.01)
(52) U.S. Cl. ...................................................... 701/300
(58) Field of Classification Search .................... 701/36, 701/45, 300, 301
See application file for complete search history.

(56) References Cited

U.S. PATENT DOCUMENTS

2003/0164936 A1 * 9/2003 Mehr et al. ................... 356/4.01
2005/0258997 A1   11/2005 Kim et al.

FOREIGN PATENT DOCUMENTS

DE         103 24 897       12/2004
WO    WO 2005/039957        5/2005

OTHER PUBLICATIONS

Coue et al., "Multi-Sensor Data Fusion Using Bayesian Programming—An Automotive Application." Proceedings of the 2002 IEEE/RSJ International Conference on Intelligent Robots and Systems, (IROS 2002), Lausanne, Switzerland, Sep. 30 to Oct. 4, 2002, IEEE/RSJ International Conference on Intelligent Robots and Systems, New York, NY, IEEE, US, vol. 1 of 3, Sep. 30, 2002, pp. 141 to 146, XP010609242, ISBN: 0-7803-7398-7.
International Search Report, PCT/EP2007/055966, dated Oct. 10, 2007.

* cited by examiner

*Primary Examiner* — Kim T Nguyen
(74) *Attorney, Agent, or Firm* — Kenyon & Kenyon LLP

(57) ABSTRACT

A driver assistance system includes a distance measuring device which detects distance values of objects from the surroundings of a vehicle. Based on a coordinate system that is fixed to the vehicle, the surroundings of the vehicle are subdivided into zones. Individual quality measures are assigned to distance values from the particular zones or measured quantities derived from these distance values. The individual quality measure is a function in particular of the variation of the component of the relative velocity in the longitudinal direction of the vehicle.

14 Claims, 2 Drawing Sheets

DRIVER ASSISTANCE SYSTEM

FIELD OF THE INVENTION

The present invention relates to a driver assistance system.

BACKGROUND INFORMATION

A driver assistance system supports the driver in driving the vehicle, for example, in observing the selected traffic lane, in an intentional lane change, in observing the safety distance to preceding vehicles, and in driving under poor visual conditions such as at night or in bad weather. Assistance functions such as LDW (Lane Departure Warning), LKS (Lane Keeping Support), LCA (Lane Change Assistant) and ACC (Automatic Cruise Control) are often implemented in a driver assistance system. To detect the surroundings of the vehicle, a driver assistance system of this type includes at least one image sensor such as a mono or stereo camera according to the CCD or CMOS technology, which is typically installed in the vehicle as a forward-looking system. Further sideways-looking or backward-looking image sensors may be installed. In addition, the driver assistance system may include a distance measuring device having radar, lidar, and ultrasound sensors. With the aid of a distance measuring device of this type, the driver assistance system may detect the distance to objects in the surroundings of the vehicle. Other traffic participants in moving or stopped traffic, roadway boundaries, as well as obstacles and the like may be considered as such objects. Velocity values may also be advantageously derived from consecutive distance measurements. To keep the risk in bumper-to-bumper traffic and/or lane change low, the measured values must be detected with the highest possible precision. Methods for deriving a quality measure for the relative velocity of an object which is detected with the aid of a surroundings detection system are already known. The quality measure is generated, for example, from the statistical fluctuations of the historically measured velocity values. This requires considerable computing complexity. In addition, a method of this type yields a result that is useless in practice if only slight fluctuations of the measured value or of the quantity derived therefrom occur. In this case, a relatively high quality measure would be incorrectly ascertained.

SUMMARY

Example embodiments of the present invention provide a driver assistance system in which a more reliable quality measure may be ascertained for measured values, in particular distance measured values or quantities derived therefrom.

Example embodiments of the present invention provide a driver assistance system having a distance measuring device, which measures distance values of objects 13, from the surroundings of a vehicle 11, the surroundings of the vehicle being subdivided into zones based on an on-board coordinate system, and individual quality measures being assigned to distance values from the particular zones or to measured quantities derived from these distance values.

By fixedly assigning a quality measure to a measured value from a certain zone, it is avoided that a quality measure that is useless in practice results as it does when a quality measure is assigned according to statistical methods if the measured value or a quantity derived therefrom changes relatively little. In a driver assistance system in which the distance measuring device generates a plurality of measuring beams, the zones being covered by one or more measuring beams, individual quality measures may alternatively and/or additionally be assigned to the distance values from the particular measuring beams or to the measured quantities derived from these distance values. It may be provided in particular to make the magnitude of the quality measure assigned to the distance values a function of the range of variation of a measured quantity derived from the distance values.

The magnitude of the quality measure assigned to the distance values may thus be a function of a change in a component of the relative velocity between an object from the surroundings of the vehicle and the vehicle, the measured quantity having a lower quality measure in the case of a smaller range of variation and a high quality measure in the case of a large range of variation. In particular, discrete quality measures may also be advantageously classified quasi-continuously by recursive filtering. Further advantages result from the description.

Example embodiments of the present invention are described in greater detail below with reference to the drawings.

DETAILED DESCRIPTION

Figure 1:
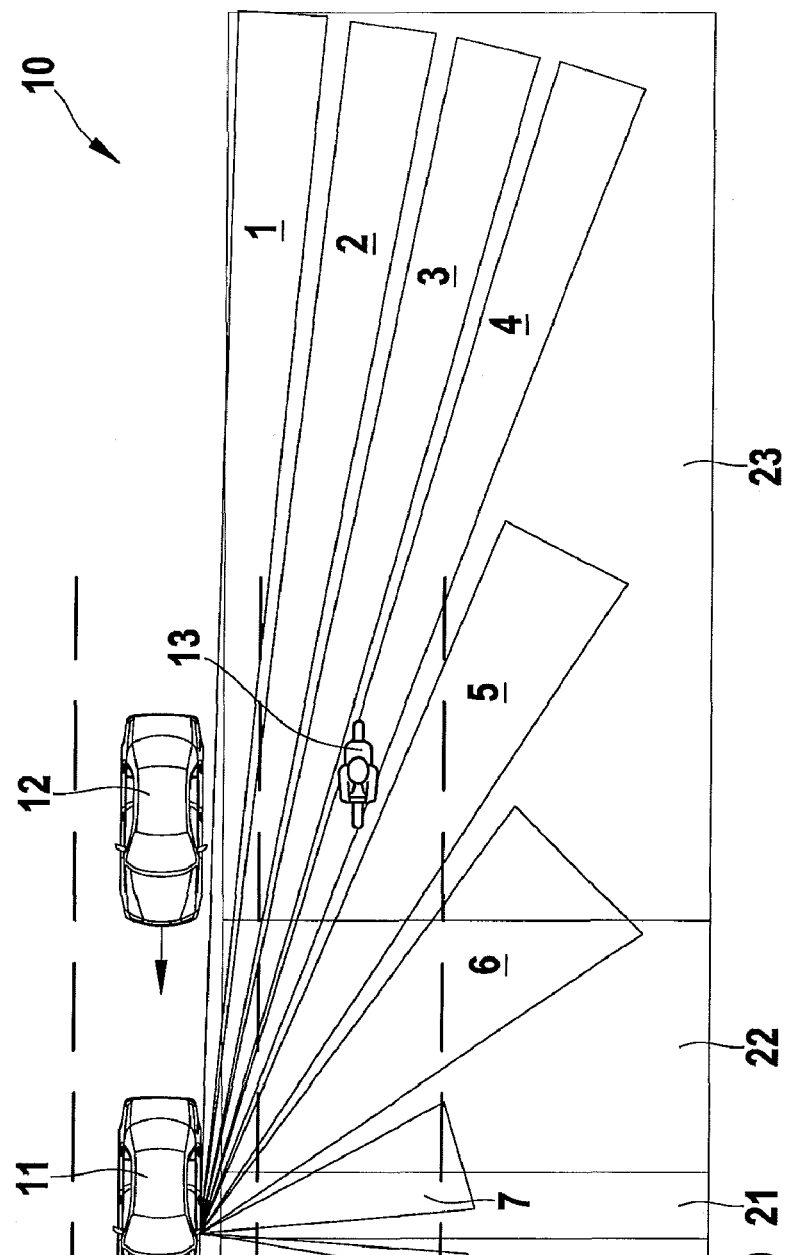
FIG. 1 shows a top view onto a roadway having a plurality of traffic lanes and a vehicle having a multibeam distance measuring device.

FIG. 1 shows a top view onto a roadway 10 which includes a plurality of traffic lanes 10.1, 10.2, 10.3. Two vehicles 11, 12 travel on traffic lane 10.1 one behind the other in the x direction. Vehicle 11 (host vehicle) is equipped with a driver assistance system including a distance measuring device. An on-board distance measuring device may be equipped with radar, lidar, or ultrasound sensors or with a combination of sensors of this type. The exemplary distance measuring device depicted here is preferably a multibeam lidar system. A multibeam lidar system is to be understood as a distance measuring device in which a plurality of measuring beams is generated, preferably staggered in time, but also optionally simultaneously, each of which detects a certain spatial angle zone of the surroundings of the vehicle. If an object is located in the particular angle zone, radiation is reflected to vehicle 11, where the radiation reflected on the object is detected and analyzed. In this manner, the angular position (azimuth) of an object hit by a measuring beam may be detected. Furthermore, the distance of the object may be ascertained from the propagation time of the beam emitted by the lidar system of 11 and reflected on the object. In the exemplary embodiment depicted in FIG. 1, the lidar system of vehicle 11 includes a total of eight measuring beams, which are labeled with reference numerals 1 through 8. Measuring beams 1 through 8 extend laterally from host vehicle 11 and cover an area of traffic lane 10.2 running to the left of the host vehicle's traffic lane 10.1. Of course, the lidar system of vehicle 11 may also include further measuring beams which cover the vehicle's surroundings in front, behind, or to the right side of vehicle 11. Measuring beams 1 through 8 depicted in FIG. 1 allow passing lane 10.2 to be properly monitored within an LCA (Lane Change Assistant) function of the driver assistance system of vehicle 11. In this manner, objects approaching vehicle 11 from behind or laterally, such as other traffic participants for example, may be reliably detected and lane change operations of vehicle 11 may be performed at a lower risk. This is true in particular when the approaching object is located exactly in the dead spot of the rear-view mirror of vehicle 11. In FIG. 1 reference numeral 13 denotes a motorcycle which approaches vehicle 11 on traffic lane 10.2 from behind. With the help of the measuring beams of the lidar system, the LCA function of the driver assistance system may determine whether or not a lane change of vehicle 11 may be performed at no risk. In the case of a risk, the attention of the driver of vehicle 11 may be expediently called to this fact via visual, acoustic, or haptic signals. If necessary, on-board systems may prevent a lane change to be initiated by intervening in the steering, braking, and/or drive system of vehicle 11 until motorcycle 13 has passed vehicle 11 and passing lane 10.2 is free again. The vehicle's surroundings detected by measuring beams 1 through 8 of the lidar system of vehicle 11 are subdivided into different zones 20, 21, 22, 23. In a coordinate system moving forward with vehicle 11, zones 20 and 21 are located at an angle to the left side of vehicle 11. Zones 22 and 23 are adjacent to the back left, sideways and backward. Zone 20 is essentially covered by measuring beam 8. Zone 21 is essentially covered by measuring beams 6 and 7. Zone 22 is essentially covered by measuring beams 1 through 7. Zone 23 is finally covered by measuring beams 1 through 6.

Figure 2:
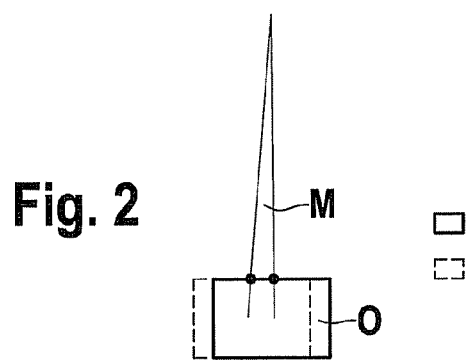
FIG. 2 shows the schematic representation of a distance measuring device of a driver assistance system having only one measuring beam.
Figure 3:
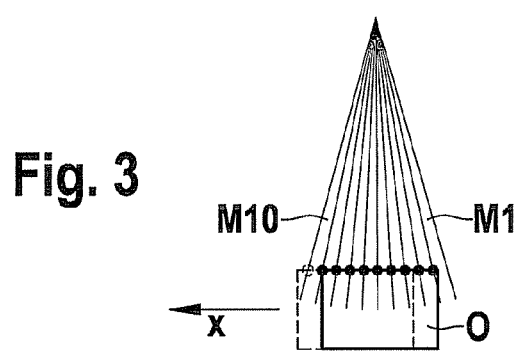
FIG. 3 shows the schematic representation of a distance measuring device of a driver assistance system having a plurality of measuring beams.
Figure 4:
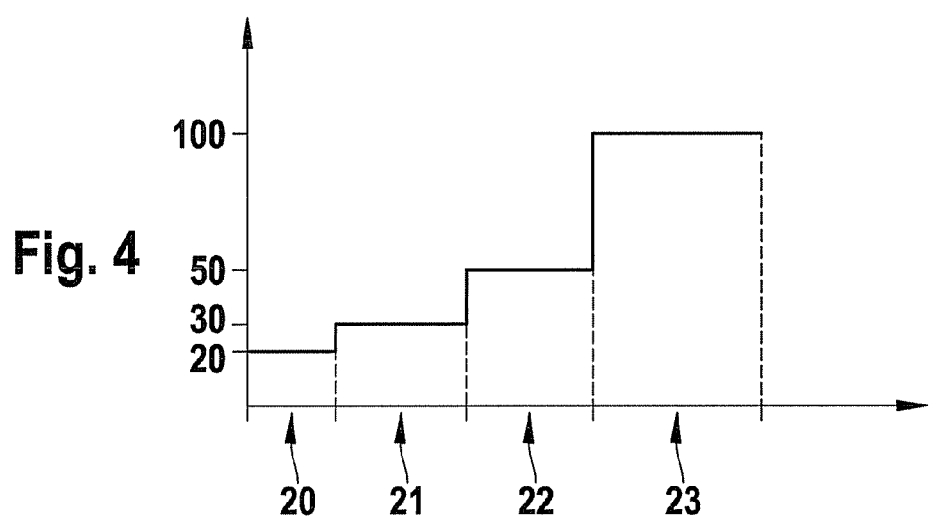
FIG. 4 shows the assignment of a quality measure to certain zones of the surroundings of a vehicle in a diagram.

If an object approaching vehicle 11, such as motorcycle 13, for example, is in zone 23, this object is hit by measuring beams 1 through 4 in a substantially radial direction. This means that in this zone 23, component $V_{rx}$ of relative velocity $V_r$ between the approaching object and vehicle 11 may be ascertained from the time derivative of the distance with a high quality measure. The smaller the movement component of the approaching objects in the radial beam direction, the more poorly this object's velocity in the x direction may be determined. This is the case, for example, in zones 20 and 21 located at an angle to vehicle 11, which are covered by measuring beams 8, or 6 and 7. In these zones 20, 21, the objects passing vehicle 11 are hit by measuring beams 6 and 7, or 8 essentially only laterally. In contrast, a velocity component $V_{ry}$ of the relative velocity in the y direction may be determined with a high quality measure. On the basis of FIG. 2 and FIG. 3, it is explained below how the structure of the measuring beams affects the possibility of detection of the relevant velocity component. FIG. 2 shows a distance measuring device having a single measuring beam M. Furthermore, the contours of an object O hit by measuring beam M at points in time t and t+Δt are depicted. In the outlined case, velocity component $V_{rx}$ detected by the distance measuring device is equal to zero because all available measuring beams of the distance measuring device, i.e., in this case only measuring beam M, hit object O at points in time t and t+Δt. In this case, the detectable relative velocity is largely independent of the velocity of object O detected by measuring beam M. A more advantageous distance measuring device having a plurality of measuring beams M1 through M10 is depicted in FIG. 3. The contours of an object detected by the measuring beams at points in time t and t+Δt are indicated again. As a result of the large number of measuring beams, this distance measuring device has a higher angular resolution. Since object O is hit by different measuring beams at different points in time, the determination of a component $V_{rx}$ of the velocity is also made easier. An analysis method which attempts to ascertain, in a conventional manner, the quality measure of measured values from the statistical fluctuation of component $V_{rx}$ of the velocity, would, in the present exemplary case, yield a totally incorrect result for the measured values obtained in zones 20 and 21. Since, namely, only very slight fluctuations of velocity component $V_{rx}$ occur, a relatively high quality measure would be incorrectly determined. This problem is solved according to example embodiments of the present invention in that a quality measure depending on the particular zone 20, 21, 22, 23, or on the particular measuring beam 1, 2, 3, 4, 5, 6, 7, 8 is assigned to the measured values. Thus, a relatively high quality measure may be assigned to the measured values from zones 22 and 23, in which a relatively great fluctuation of velocity component $V_{rx}$ occurs. If a zone is covered by a plurality of measuring beams, such as, for example, zone 23 by measuring beam 1 through 6, an individual quality measure which is a function of the expected fluctuation of velocity component $V_{rx}$ may advantageously be assigned to measured values from each of these measuring beams. FIG. 4 also shows, in a schematic diagram, the assignment of a quality measure to a certain zone from the surroundings of a vehicle. Thus, a maximum quality measure of 100% is assigned to measured values from zone 23, while a relatively low quality measure is assigned to measured values from zone 20.

Alternatively or additionally to its use in the LCA function of the driver assistance system, the determination of a quality measure associated with a particular measuring beam may advantageously also be used for other functions of a driver assistance system, for example, in functions provided for longitudinal guidance such as ACC (Automatic Cruise Control) or ACC-FSR (Automatic Cruise Control—Full-Speed Range). Furthermore, in emergency braking functions or occupant protection systems which include pre-crash detection.

What is claimed is:

1. A driver assistance system, comprising:
    a distance measuring device adapted to:
        detect distance values of objects in surroundings of a vehicle, which surroundings are subdivided into a plurality of zones that are defined by the distance measuring device with respect to a coordinate system that is fixed to the vehicle; and
        depending on to which of the plurality of zones respective ones of the detected distance values correspond, assign respective quality measures to at least one of (a) the respective detected distance values and (b) measured quantities derived from the respective distance values.

2. The driver assistance system according to claim 1, wherein:
    the distance measuring device is adapted to generate a plurality of measuring beams, each of the separated zones covered by at least one respective one of the measuring beams; and
    the distance values are obtained from respective ones of the measuring beams.

3. The driver assistance system according to claim 2, wherein at least some of the measuring beams extended laterally from the vehicle.

4. The driver assistance system according to claim 2, wherein at least some of the measuring beams extend laterally from at least one of a front, a back, and a side of the vehicle.

5. The driver assistance system according to claim 1, wherein respective magnitudes of respective ones of the assigned quality measures are determined as a function of a range of variation of a measured quantity derived from the respective distance values to which the respective assigned quality measures correspond.

6. The driver assistance system according to claim 5, wherein the measured quantity is a component of a relative velocity between an object from the surroundings of the vehicle and the vehicle.

7. The driver assistance system according to claim 5, wherein, in the case of a small range of variation, a low quality measure is assigned to the measured quantity.

8. The driver assistance system according to claim 5, wherein, in the case of a large range of variation, a high quality measure is assigned to the measured quantity.

9. The driver assistance system according to claim 1, wherein the assigned quality measures are classified quasi-continuously by recursive filtering.

10. The driver assistance system according to claim 1, wherein the distance measuring device is arranged as a multi-beam distance measuring device in conjunction with a lane change assistance function.

11. The driver assistance system according to claim 1, wherein each of the separated zones is at a respective spatial angle relative to the vehicle.

12. The driver assistance system according to claim 1, wherein the distance measuring device is equipped with at least one radar sensor.

13. The driver assistance system according to claim 1, wherein the distance measuring device is equipped with at least one lidar sensor.

14. The driver assistance system according to claim 1, wherein the distance measuring device is equipped with at least one ultrasound sensor.

* * * * *

UNITED STATES PATENT AND TRADEMARK OFFICE
CERTIFICATE OF CORRECTION

PATENT NO. : 8,370,055 B2  Page 1 of 1
APPLICATION NO. : 12/302445
DATED : February 5, 2013
INVENTOR(S) : Koehler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1014 days.

Signed and Sealed this
First Day of September, 2015

Michelle K. Lee
*Director of the United States Patent and Trademark Office*